United States Patent Office 3,374,095
Patented Mar. 19, 1968

3,374,095
GELATIN-CONTAINING PHOTOGRAPHIC LAYERS PLASTICIZED WITH POLYURETHANE
Dieter Dieterich and Otto Bayer, Leverkusen, Wolfgang Himmelmann, Cologne-Stammheim, and Hans Ulrich, Leverkusen, Germany, assignors to Agfa Aktiengesellschaft, Leverkusen, Germany, a corporation of Germany
No Drawing. Filed Mar. 25, 1964, Ser. No. 354,795
Claims priority, application Germany, Apr. 13, 1963,
A 42,880
8 Claims. (Cl. 96—111)

ABSTRACT OF THE DISCLOSURE

Gelatin is effectively plasticized by a linear polyurethane of a polyether glycol or of a polyester of an aliphatic dicarboxylic acid, which polyurethane contains a tertiary nitrogen that is either quaternized, or in the form of a salt of an acid, and the polyurethane being infinitely miscible with gelatin. Such plasticizing does not interfere with the photographic use of the gelatin and provides a photographic emulsion of reduced curling tendency.

---

This invention relates to gelatin layers, especially for photographic materials, the mechanical properties of which are improved by the addition of high molecular weight polyether-polyurethanes.

In photography, the substance mainly used as hydrophilic protective colloid for light-sensitive silver halide emulsions and other auxiliary layers, is gelatine. The physical properties of a gelatin layer, e.g., brittleness, elasticity and resistance to temperatures depend to a large extent on the moisture of the room. If the gelatine dries out to a considerable extent, it shrinks and exerts tensions which may deform the supporting layer. Gelatine-containing photographic emulsions which have been cast onto cellulose triacetate films break if they are very dry and exposed to bending stresses. This often causes the support to break too. It is common practice to improve the mechanical properties of such layers even when extremely dry by the addition of a gelatin plasticiser.

In principle, there are various possibilities:

(a) Substances which influence the water content of gelatine. Particularly important in this connection are di- and polyalcohols such as glycol, glycerol, mannitol, dulcitol and others as well as derivatives of lower polyethylene glycols. They are often hygroscopic substances which detract from the non-marring nature of the surfaces of the gelatine layers at high humidities, and which remove the residual moisture from the gelatins at low humidities so that the layers become even more brittle. They have the further disadvantage that low molecular weight components diffuse out of the layer during processing so that any plasticising effect that may be present is lost. A similar behaviour is manifested by the derivatives of polyethylene glycols, e.g., esters, ethers, condensation products of dibasic carboxylic acids and polyalkylene oxides and phosphoric acid esters of oligomeric ethylene oxide derivatives. Polyalcohols of high molecular weight, such as polyvinyl alcohol, are not compatible with gelatin at higher concentrations and are not effective as plasticisers.

(b) Another class of compounds which is known as plasticisers for gelatin comprise variously substituted amides such as monoamides of dicarboxylic acids, fatty acid amides or cyclic amides such as caprolactam and its acylated products. These are also low molecular weight products and generally diffuse out of the layer during processing.

(c) Apart from the above-mentioned compounds which are homogeneously distributed in the gelatin, a large number of copolymers have been proposed as plasticisers. They are used in the form of very fine droplets in the gelatin and impart to the layer a certain flexibility due to the plasticity or elasticity which can be adjusted by the proportions of the monomers. Copolymers of butyl acrylate, acrylonitrile, acrylamide and other polymerizable monomers are known. A disadvantage in the case of color layers is the optical turbidity of the layers in the wet state, which cannot be eliminated, due to the change in refractive index of gelatin on swelling.

It is an object of the present invention to provide gelatin layers having improved mechanical properties. A further object is to provide photographic materials which have such improved gelatin layer. Further objects and advantages some of which are specifically referred to hereinafter will be apparent to any person having ordinary skill in the art to which this application pertains.

The objects have been attained by employing as additives for gelatin layers in particular photographic gelatin layers, high-molecular weight polyurethanes.

The polyurethanes of the present invention are reaction products of aliphatic polyols with polyisocyanates. According to a preferred embodiment, the polyurethanes are additionally made with a chain lengthening component with reactive hydrogen atoms, especially diols, diamines and amino alcohols. At least one of the components of the polyurethane contains at least one tertiary nitrogen atom, which has been converted into a quaternary nitrogen atom upon reaction with alkylating agents, or organic or inorganic acids.

Under the term active hydrogen atoms are to be understood those hydrogen atoms which are reactive with —NCO groups and which can be determined by the Zerewitinoff method.

In the long chains, 1–4 (preferably 1–2) tetravalent ammonium nitrogen atoms are situated at a distance of at least 1000 (preferably 2000–10,000) molecular weight units.

The compounds are produced by reacting aliphatic polyhydroxy compounds, diisocyanates and if desired chain lengthening agents. The quantity of polyisocyanate is adjusted so that all the OH and $NH_2$ groups react. The resulting composition which contains predominantly linear, high molecular weight polyurethanes is then dissolved in an organic solvent and the tertiary nitrogen present is partly or completely converted into ammonium salts by means of alkylating agents and/or acids. After addition of water, the organic solvent is evaporated.

The following are examples of suitable compounds for use as starting components for the polymer:

I. *Aliphatic polyhydroxy compounds*

These are preferably linear and have a molecular weight of between 800 and 10,000, preferably 1,500 to 3,000.

(a) Polyetherglycols with terminal hydroxy groups:

Polymerisation products of tetrahydrofuran, propylene oxide, ethylene oxide and their copolymers. Also homogeneous or mixed polyethers which have been obtained, for example, by condensation of hexanediol, methylhexanediol, heptanediol or octanediol, if desired with the addition of 10–30% of lower glycols. Ethoxylated or propoxylated (or mixed alkoxylated) glycols such as ethylene glycol, propylene glycol, butanediol, xylylene glycol, hexanediol and the like, may also be used. Examples of polyether components with tetravalent nitrogen are alkoxylated, in particular ethoxylated and propoxylated, glycols with tertiary amino groups, e.g., propoxylated methyl diethanolamine or alkoxylated primary amines, e.g., alkoxylated n-butylamine, aniline, toluidine, piperazine.

(b) Polyesters with hydroxy groups: Such products are obtained in known manner by reaction of polyhydric alcohols such as ethyleneglycol and polycarboxylic acids, preferably aliphatic dicarboxylic acids, more particular those having 4 to 10 carbon atoms. There can also be used polyester amides which are reaction products of the same polycarboxylic acids with amino alcohols such as ethanol amine. Polyesters with tertiary amino groups are obtained by performing the condensation in the presence of, for example, methyldiethanol amine. Suitable alcohols for the production of the polyesters are aliphatic alcohols having up to 8 carbon atoms, for example, glycol, butandiol, hexandiol, neopentylglycol or trimethylol propan. Others that can be used are diethyleneglycol or oligoethyleneglycols generally, preferably those containing up to 12 ethyleneglycol units.

II. Diisocyanates

Particularly suitable are aliphatic diisocyanates with 1 to 10 $CH_2$-groups and terminal isocyanate groupings, such as hexamethylenediisocyanate, aromatic diisocyanates of the phenol and naphthyl series such as phenylene-1,3-diisocyanate, phenylene-1,4-diisocyanate, toluylene-diisocyanate, 4,4'-diphenylmethane-diisocyanate and 4,4'-dibenzyl-diisocyanate.

Also suitable are cyclomatic diisocyanates including in particular compounds of the 4,4'-dicyclohexylmethane-diisocyanate type.

The quaternizable group and diisocyanate groups can also be contained in a polyisocyanate. Polyisocyanates of this type, which can be mixed with the simple diisocyanates, can be obtained by reacting 2 mols of one of the aforementioned diisocyanates with one mol of methyl diethanolamine, butyl diethanolamine, N,N-dihydroxyethyl aniline, N,N-dihydroxyethyl toluidine or the like.

III. Chain lengthening agents with active H-atoms

The chain lengthening agents should contain an active hydrogen atom which is reaction with isocyanate groups. Products which can be used for the preparation of the polyurethane polymers have a molecular weight of less than about 350.

Preferred are aliphatic compounds which contain up to 8 carbon atoms such as polyhydric alcohols, diamines and amino alcohols. The following compounds are suitable: ethylene glycol, propylene glycol, butylen glycol, diethylene glycol, oligoethylene glycols, butanediol, hexanediol, neopentylglycol, trimethylolpropane, xylylene glycol, phenyl bis(β-hydroxy ethyl ether), pentaerythritol and the like. Suitable diamines are: ethylenediamine, butylenediamine, hexamethylenediamine, phenylenediamine, toluylenediamine, 4,4'-diamino diphenylmethane, 3,3'-dichloro-4,4'-diamino diphenylmethane, hydrazine and the like. Water can also be used as chain-lengthening agent. These agents are added in amounts of 0.5–20% based on the aliphatic polyhydroxy Compound I.

IV. Chain lengthening agents which contain tertiary nitrogen

Preferred are addition products of alkylene oxide such as ethylene oxide or propylene oxide with primary amines wherein the amine substituent is alkyl preferably having up to 5 carbon atoms, a phenyl group, a naphthyl group, cycloalkyl such as cyclohexyl or a heterocyclic radical. The alkanol group formed preferably has 2–4 carbon atoms. The products are obtained, for example, by reaction of 2 mols ethylene oxide or propylene oxide with a primary amine. Suitable products are, e.g., methyldiethanolamine, butyldiethanolamine, oleyldiethanolamine, dioxethylaniline, dioxethyltoluidine, dioxethylpiperazine, dioxethylcyclohexylamine or methyl diisopropanolamine. Also suitable are addition products of alkylene oxides and tertiary amino compounds which contain primary or secondary amino groups capable of reaction with alkylene oxides, such as bis-aminopropylmethylamine.

These agents are added in amounts of 0.5–20% based on the aliphatic polyhydroxy Compound I.

V. Alkylating agents

Suitable are the agents used to quaternize tertiary nitrogen atoms such as, e.g., methyl chloride, methyl bromide, dimethylsulfate, diethylsulfate, benzyl chloride, p-nitrobenzyl chloride, benzyl bromide, ethylenebromohydrin, ethylene chlorohydrine, epichlorohydrine, bromobutane, p-toluenesulfonic acid methyl ester, propanesultone and butanesultone. The amount of alkylation agents which is used depends on the number of the quaternizable groups present in the polyurethane composition. Usually all of the tertiary nitrogen atoms are quaternized, but it is possible to apply less than the calculated amount in order to modify the properties of the resulting polyurethane. The alkylating agents can be replaced partially or totally by acids which are listed below. It is preferred, however, to apply only alkylating agents.

VI. Acids

Suitable are inorganic or organic acids, e.g., hydrofluoric acid, hydrochloric acid, hydrobromic acid, nitric acid, perchloric acid, fluoboric acid, sulphonic acids, acetic acid, glycollic acid, acrylic acid, lactic acid, salicylic acid, benzoic acid, chloroacetic acid, aminosulphonic acid, hydroxylamine monosulphonic acid, formic acid, glutaric acid, succinic acid, malic acid, fumaric acid, sulphanilic acid and pyridinocarboxylic acid.

The polyurethanes of the present invention are infinitely miscible with gelatine in solution and in the dry state. The layers obtained are in most cases completely clear even when wet because the polyurethanes according to the invention swell with the gelatine to a certain extent so that their refractive index, like that of gelatin, alters with increasing moisture content. Owing to their high molecular weight, the compounds are fast to diffusion. They are stable to hydrolytic agents. They are photographically inert and in contrast to the low molecular weight ethylene oxide derivatives they do not produce increased fogging. They are compatible with emulsions containing silver halide, sensitizing dyes and color couplers. The viscosity of the solution of gelatin emulsions containing color couplers is reduced by the addition of compounds, which is a great advantage when casting the solutions. The solutions can therefore be cast at higher speeds.

The plasticising effect of the compounds of the invention are preserved even after the colloid layers have been subjected to low relative humidities. Since the tensions produced in the layers with alteration in the humidity are considerably reduced by the addition of the substances the photographic films and papers obtained do not curl. Since the compounds themselves swell only slightly, they hardly contribute to the swelling of the whole layer, so that the swelling factors, i.e. the ratio of thickness of swelled layer to thickness of dry layer, are low. This improves the dimension stability of the films.

The compounds according to the invention are added in aqueous or aqueous organic solution or in aqueous dispersion to the emulsions or casting solutions. The concentration employed is 5–200%, preferably 10–30% calculated on the dry weight of the gelatin. The usual recipes of casting compositions can be used unchanged. The hardening agent necessary for hardening also can be used unchanged. The compounds according to the invention are compatible both with water-soluble colour couplers and with hydrophobic colour couplers, dispersed in water, in the gelatin solution and they do not interfere with the colour coupling in the colour photographic process.

The polyurethanes of the present invention can be used in the light-sensitive silver halide emulsion layer, the silver halide of which may consist of silver chloride or silver bromide or mixtures thereof which may contain a small amount of silver iodide.

The compounds can be used in all the photographic layers, e.g., in gelatin-containing separating and intermediate layers in the case of multi-layer elements and in protective and backing layers.

Suitable compounds are, for example, the following reaction products:

Compound I: Polyaddition product of 1 kg. polypropylene glycol, 353 g. toluylene-2,4-diisocyanate, 180 g. N-methyl-diethanolamine and 45.5 g. formic acid.

Compound II: Polyaddition product of 1 kg. polypropylene glycol, 353 g. toluylene-2,4-diisocyanate, 180 g. N-methyl-diethanolamine, and 98.0 g. acetic acid.

Compound III: Polyaddition product of 1 kg. polypropylene glycol, 342 g. diphenylmethane-4,4'-diisocyanate, 135 g. n-butyl-diethanolamine and 99.0 g. dimethylsulphate.

Compound IV: Polyaddition product of 1 kg. polypropylene glycol, 353 g. toluylene-2,4-diisocyanate, 180 g. N-methyl-diethanolamine and 1.2 litres N—HCl.

Compound V: Polyaddition product of 1 kg. polypropylene glycol, 381 g. diphenylmethane-4,4'-diisocyanate, 120 g. N-methyl-diethanolamine and 120 g. dimethylsulphate.

Compound VI: Polyaddition product of 1 kg. polypropylene glycol, 532 g. diphenylmethane-4,4'-diisocyanate, 300 g. N-methyl-diethanolamine and 1.2 litres $CH_3Cl$.

Compound VII: Polyaddition product of 1 kg. polypropylene glycol, 381 g. diphenylmethane-4,4'-diisocyanate, 120 g. N-methyl-diethanolamine and 150 ml. $CH_3Cl$.

Compound VIII: 1 kg. polyethoxylated polypropylene glycol of molecular weight 2400 obtained by reacting a polypropylene glycol of molecular weight 2000 with 8 mols ethylene oxide, 200 g. diphenylmethane-4,4'-diisocyanate, 14 g. N-methyl-diethanolamine and 150 ml. N—HCl.

Compounds having a similar effect are obtained when the polypropylene glycol ethers used in the preparation of the above compounds are replaced by corresponding quantities of polyethylene glycol ethers or polytetrahydrofuran.

Compound IX: Polyaddition product of 1 kg. of a polyester (prepared by reaction of 7 mols of adipic acid, 5 mols hexandiol and 3 mols of neopentyl glycol) 140 g. of 1,6-hexanediisocyanate, 12 g. of N-methyl-diethanolamine and 100 ml. methyl chloride.

Compound X: Polyaddition product of 1 kg. of the polyester described above, 416 g. of diphenylmethan-4,4-diisocyanate, 120 g. N-methyl-diethanolamine and 640 ml. of methyl chloride.

Compound IX: Polyaddition product of 1 kg. of a polyester (prepared by reaction of adipic acid and a slight molar excess of ethyleneglycol—the polyester has a molecular weight of 2000), sufficient diisocyanate, 60 g. of N-methyldiethanol amine and 47 ml. of dimethylsulfate.

The above compounds may be prepared according to the following general method:

1 kg. of polypropylene glycol of molecular weight 2000 is dehydrated in vacuo for 20 minutes at 120° C. and then reacted with the diisocyanate. After cooling the reaction mixture to 40° C., all the chain lengthening agent is poured and stirred in at once and the melt, which rapidly becomes highly viscous, is then heated for a few hours at 60 to 100° C. The polyurethane mass obtained (Defo hardness 200–4000 at 20° C.) is dissolved in acetone and the approximately 33% acetone solution is quaternized at 20 to 80° C. or converted into the salt. Water is then added and the acetone is removed in vacuo.

The proportions and conditions chosen for the individual compounds are shown in the following table:

| Compound | Reaction time and temperature | Quantity of water added in liters | pH | Final solid content of the aqueous solution, percent |
|---|---|---|---|---|
| I | 30', 20° C | 5.3 | 6 | 24 |
| II | 30', 20° C | 11.4 | 5 | 12 |
| III | 60', 55° C | 9.0 | 4.5 | 32 |
| IV | 30', 20° C | 3.3 | 5 | 27 |
| V | 30', 50° C | 3.4 | 5 | 33 |
| VI | 4ʰ, 80° C | 7.5 | 7 | 20 |
| VII | 4ʰ, 80° C | 4.5 | 6 | 25 |
| VIII | 30ʰ, 20° C | 2.3 | 5 | 26 |
| IX | 4ʰ, 80° C | 2.0 | 6 | 40 |
| X | 4ʰ, 80° C | 5.6 | 6 | 20 |
| XI | 30', 20° C | 4.3 | 6 | 32 |

*Example 1*

To samples of a mixture of
1 liter of a photographic emulsion which contains 35 g. of silver halide and 80 g. of gelatin
30% of each of the Compounds I–IV, VIII and IX, calculated on the quantity of gelatin, are added with vigorous stirring. 20 g. of 1-hydroxy-4-sulfo-2-naphthoic acid heptadecylamide are then added as color component. The mixtures are cast onto a support of cellulose triacetate with a gelatin subbing layer and the layer thus obtained is dried at room temperature. The thickness of the layers is adjusted to 18μ. Test strips measuring 1.5 cm. in width and 30 cm. in length are stamped out of the lengths of film, and these strips, developed in accordance with the color process for negative cine films given in the final Fiat Report 943, p. 85, are kept for 48 hours in an atmosphere of 35% relative humidity and in 50% relative humidity at 22° C. The brittleness of the film strips is determined by the following test which is also carried out under the above atmospheric conditions.

The film strips are pulled with their covered side outwards over two guide rollers mounted on ball bearings (diameter of rollers 5 mm.) which bend the film twice at right angles at a distance of 1.5 cm. The film is stretched with a weight of 1 kg. and periodically pulled over both guide rollers by an eccentric arrangement. At each stroke the film is subjected to a powerful mechanical stress and it tears after a certain number of strokes. This number of strokes is determined automatically and is a measure of the mechanical quality of a film; the higher the number of strokes, the greater the mechanical quality of the film. The values given are average values obtained from four measurements. The measurement is stopped on reaching the value 1500. Only films of exceptional quality have this value. Furthermore, the brittleness of the support interferes too much with the measurement at values above 1500.

RESULT

| Addition | Number of strokes at— | |
|---|---|---|
| | 35% relative humidity | 50% relative humidity |
| Control | 9 | 210 |
| 30% Polyurethane I | 370 | 1,500 |
| 30% Polyurethane II | 530 | 800 |
| 30% Polyurethane III | 150 | 410 |
| 30% Polyurethane IV | 480 | 1,500 |
| 30% Polyurethane VI | 1,273 | 1,500 |
| 30% Polyurethane VIII | 780 | 1,380 |
| 30% Polyurethane IX | 265 | 1,500 |

It is apparent from the figures that the polyurethanes of the invention considerably reduce the brittleness at 35% relative humidity. At 50% relative humidity, film samples of excellent mechanical quality are obtained.

The layers are sufficiently clear and do not become opaque when immersed in water. The layers have no oily deposits on the surface. The tendency to curly is considerably reduced. The developed strips have no photographic disadvantages whatever. No fogging can be detected.

*Example 2*

To separate portions of a solution of a photographic gelatine in water, which in addition contains 0.5% of the filter dyestuff tartrazine and 0.3% Formalin, there are added 50%, 100% and 150% of Compound V (calculated on the dry weight of gelatin). The casting solution is cast onto a warmed unprepared glass plate and dried to produce filter foils about $20\mu$ in thickness, which are removed and are then dried for 12 hours in a drying cupboard at 60° C.

Whereas a filter foil without additive immediately breaks up when bent sharply, the foils containing additive are elastic. The fragility is very greatly reduced. The color of the filter dyestuff is not altered. Moreover, the tartrazine is firmly embedded in the gelatine and is not washed out.

*Example 3*

To samples of 1 liter portions of an 8% gelatin which contains 0.5% tartrazine are added:

Test 1: 6 cc. Formalin solution 3% (standard test)
Test 2:
    400 cc. Compound VII 10%
    6 cc. Formaline 3%
Test 3:
    800 cc. Compound VII 10%
    6 cc. Formalin 3%

The solutions are as backing layers cast onto a cellulose triacetate film provided with a subbing layer. The thickness of the backing layer is about $12\mu$. Swelling is determined after 10 minutes' bathing in distilled water at 22° C. The table below gives the quotient of the layer thickness after swelling and layer thickness of the dry layer, which quotient is to be termed the swelling factor. The swelling factor that was determined immediately after drying of the film is termed $QF_{fresh}$ and the factor determined after 60 hours storage at 50° C. is termed $QF_{aged}$.

| Sample | $QF_{fresh}$ | $QF_{aged}$ |
|---|---|---|
| 1. Standard | 4.2 | 3.0 |
| 2. Mixing ratio—Gelatine/Compound VII, 2:1 | 3.1 | 2.0 |
| 3. Mixing ratio—Gelatine/Compound VII, 1:1 | 2.5 | 1.8 |

These figures show that the swelling of a backing layer is reduced by the addition of Compound VII.

*Example 4*

2 liters of a photographic silver halide emulsion which contains 60 g. silver halide in 160 g. gelatin is divided into two equal portions. To one portion are added 400 cc. 10% gelatin and 6 cc. Formalin 3% and to the other, 400 cc. Compound VII 10% and 4 cc. Formalin 3%.

To both samples were added the same quantities of Formalin calculated on the gelatine content. Layers about $10\mu$ in thickness were formed from these solutions on a triacetyl cellulose film provided with a subbing layer. The swelling factors of the layers were determined as in Example 3.

RESULT

| Sample | $QF_{fresh}$ | $QF_{aged}$ |
|---|---|---|
| 1. Standard | 6.4 | 3.9 |
| 2. 50% Addition of Compound VII | 3.7 | 2.6 |

The table shows that the swelling of the layer is considerably reduced by the addition of Compound VII. The photographic properties are not changed. Neither fogging nor any reduction in senstivity could be detected.

What is claimed is:

1. Gelatin plasticized with a linear polyurethane of an aliphatic polyol having a molecular weight between 800 and 10,000, said polyol being a polyether glycol or a polyester of an aliphatic dicarboxylic acid with an aliphatic polyalcohol, the polyurethane containing a tertiary nitrogen that is either quaternized or in the form of a salt of an acid, and the polyurethane being infinitely miscible with gelatin.

2. The combination of claim 1 in which the polyurethane is present in a concentration of from about 10 to about 30%, based on the dry weight of the gelatin.

3. The combination of claim 1 in which the polyurethane is a polyurethane of a polypropylene glycol.

4. The combination of claim 1 in which the polyurethane is a polyurethane of a mixture of dihydroxy compounds, one of which contains a tertiary amine group.

5. In a light-sensitive silver halide emulsion in gelatin, the improvement according to which the gelatin is plasticized with a linear polyurethane of a polyaliphatic polyol having a molecular weight between 800 and 10,000, said polyol being a polyether glycol or a polyester of an aliphatic dicarboxylic acid with an aliphatic polyalcohol, the polyurethane containing a tertiary nitrogen that is either quaternized or in the form of a salt of an acid, and the polyurethane being infinitely miscible with gelatin.

6. The combination of claim 5 in which the polyurethane is present in a concentration of from about 10 to about 30%, based on the dry weight of the gelatin.

7. The combination of claim 5 in which the polyurethane is a polyurethane of a polypropylene glycol.

8. The combination of claim 5 in which the polyurethane is a polyurethane of a mixture of dihydroxy compounds, one of which contains a tertiary amine group.

References Cited

UNITED STATES PATENTS

| | | | |
|---|---|---|---|
| 3,038,804 | 6/1962 | Knox et al. | 96—111 |
| 3,235,381 | 2/1966 | Feild et al. | 96—40 |
| 3,255,000 | 6/1966 | Gates et al. | 96—111 |
| 3,305,376 | 2/1967 | Burness et al. | 96—111 |

J. TRAVIS BROWN, *Primary Examiner.*

NORMAN G. TORCHIN, *Examiner.*

R. E. MARTIN, J. H. RAUBITSCHEK,
    *Assistant Examiners.*